(12) United States Patent
Tung et al.

(10) Patent No.: US 6,241,466 B1
(45) Date of Patent: Jun. 5, 2001

(54) TURBINE AIRFOIL BREAKOUT COOLING

(75) Inventors: Stephen K. Tung, Andover; Donald C. Weldon, Boxford, both of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/323,327

(22) Filed: Jun. 1, 1999

(51) Int. Cl.[7] .......................................................... F01D 5/14
(52) U.S. Cl. ............................ 415/115; 415/191; 416/97 R
(58) Field of Search ................................. 415/115, 176, 415/178, 191, 181; 416/96 R, 97 R

(56) References Cited

U.S. PATENT DOCUMENTS

| | | |
|---|---|---|
| 4,303,374 | 12/1981 | Braddy . |
| 4,314,442 * | 2/1982 | Rice ..................................... 60/39.05 |
| 4,353,679 * | 10/1982 | Hauser ................................... 145/115 |
| 4,545,197 * | 10/1985 | Rice ..................................... 60/39.05 |
| 4,601,638 | 7/1986 | Hill et al. . |
| 5,368,441 | 11/1994 | Sylvestro et al. . |

* cited by examiner

Primary Examiner—Edward K. Look
Assistant Examiner—Ninh Nguyen
(74) Attorney, Agent, or Firm—Andrew C. Hess; Rodney M. Young

(57) ABSTRACT

A turbine airfoil includes pressure and suction sides extending between leading and trailing edges and defining an internal cooling air passage. A row of trailing edge holes is disposed in flow communication with the air passage behind the trailing edge. The airfoil is sized in conjunction with an adjacent airfoil for accelerating combustion gases along the pressure side at the trailing edge holes to a velocity at least as high as the velocity of the cooling air discharged from the holes.

20 Claims, 3 Drawing Sheets

TURBINE AIRFOIL BREAKOUT COOLING

BACKGROUND OF THE INVENTION

The present invention relates generally to gas turbine engines, and, more specifically, to turbine nozzle performance and cooling.

In a gas turbine engine, air is pressurized in a compressor and mixed with fuel and ignited in a combustor for generating hot combustion gases which flow through turbine stages for extracting energy therefrom. In a turbofan engine, a high pressure turbine powers the compressor, and a low pressure turbine powers a fan disposed upstream from the compressor. Each turbine includes a stationary turbine nozzle having vanes mounted between inner and outer bands, followed in turn by a row of rotor blades extending outwardly from a rotor disk.

The high pressure turbine nozzle is disposed at the outlet of the combustor and receives therefrom combustion gases at the hottest temperature, with the temperature decreasing as energy is extracted from the gases in the downstream turbine stages. Both the nozzle vanes and rotor blades have hollow airfoils through which a portion of air bled from the compressor is used for providing cooling thereof. Bleeding cooling air from the compressor necessarily decreases the overall efficiency of the engine, and it is therefore desired to use as little cooling air as possible while adequately cooling the vanes and blades.

The profile or contour of the turbine airfoils is controlled by the specific thermodynamic operating cycle of the engine, and cooperating aerodynamic performance. Each airfoil has a generally concave, pressure side and a generally convex, suction side extending axially between leading and trailing edges and radially between a root and tip. The airfoil increases in thickness just aft of the leading edge and then tapers with a reduced thickness to a thin trailing edge.

Since the trailing edge is thin, it is difficult to cool during operation and typically operates relatively hot which affects the useful life of the airfoil. Trailing edge cooling of the first stage nozzle of the high pressure turbine is particularly critical in view of the hot combustion gases directly received from the combustor.

Trailing edge cooling may be provided in various conventional manners in which the cooling air is channeled inside the airfoil directly behind the trailing edge and is discharged through a row of trailing edge cooling holes thereat. In one design, the trailing edge holes have outlets along the airfoil pressure side which begin at a breakout lip forward of the trailing edge and terminate directly at the trailing edge. Since the thickness of the breakout lip has a practical minimum value to prevent deterioration and oxidation during operation, the breakout distance from the trailing edge to the lip is relatively large.

Accordingly, as the cooling air is discharged through the trailing edge holes, it is heated by the combustion gases which decreases its ability to cool the trailing edge. Furthermore, fluid flow behind the trailing edge locally stagnates in the wake thereof further increasing the difficulty of cooling the trailing edge itself.

Additional considerations in airfoil cooling include the conventionally known backflow margin and blowoff margin. The cooling air is bled from the compressor at a corresponding pressure to ensure a suitable differential pressure between the cooling air inside the airfoil and the pressure of the combustion gases outside the airfoil for driving the cooling air through the airfoil. A suitable backflow margin prevents the reverse flow of combustion gases into cooling air holes in the airfoil. And, a suitable blowoff margin prevents excessive discharge velocities of the cooling air as it exits the cooling holes.

However, in a conventional turbine nozzle design, for example, the cooling air discharged from the trailing edge, pressure side holes has a greater velocity than that of the combustion gases which flow therealong. Accordingly, as the high speed cooling air meets the low speed combustion gases at the hole outlets, mixing losses are created which affects both the overall performance of the engine and affects the ability to cool the airfoil trailing edge.

Accordingly, it is desired to provide an improved turbine airfoil trailing edge configuration for reducing mixing losses and improving trailing edge cooling.

BRIEF SUMMARY OF THE INVENTION

A turbine airfoil includes pressure and suction sides extending between leading and trailing edges and defining an internal cooling air passage. A row of trailing edge holes is disposed in flow communication with the air passage behind the trailing edge. The airfoil is sized in conjunction with an adjacent airfoil for accelerating combustion gases along the pressure side at the trailing edge holes to a velocity at least as high as the velocity of the cooling air discharged from the holes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
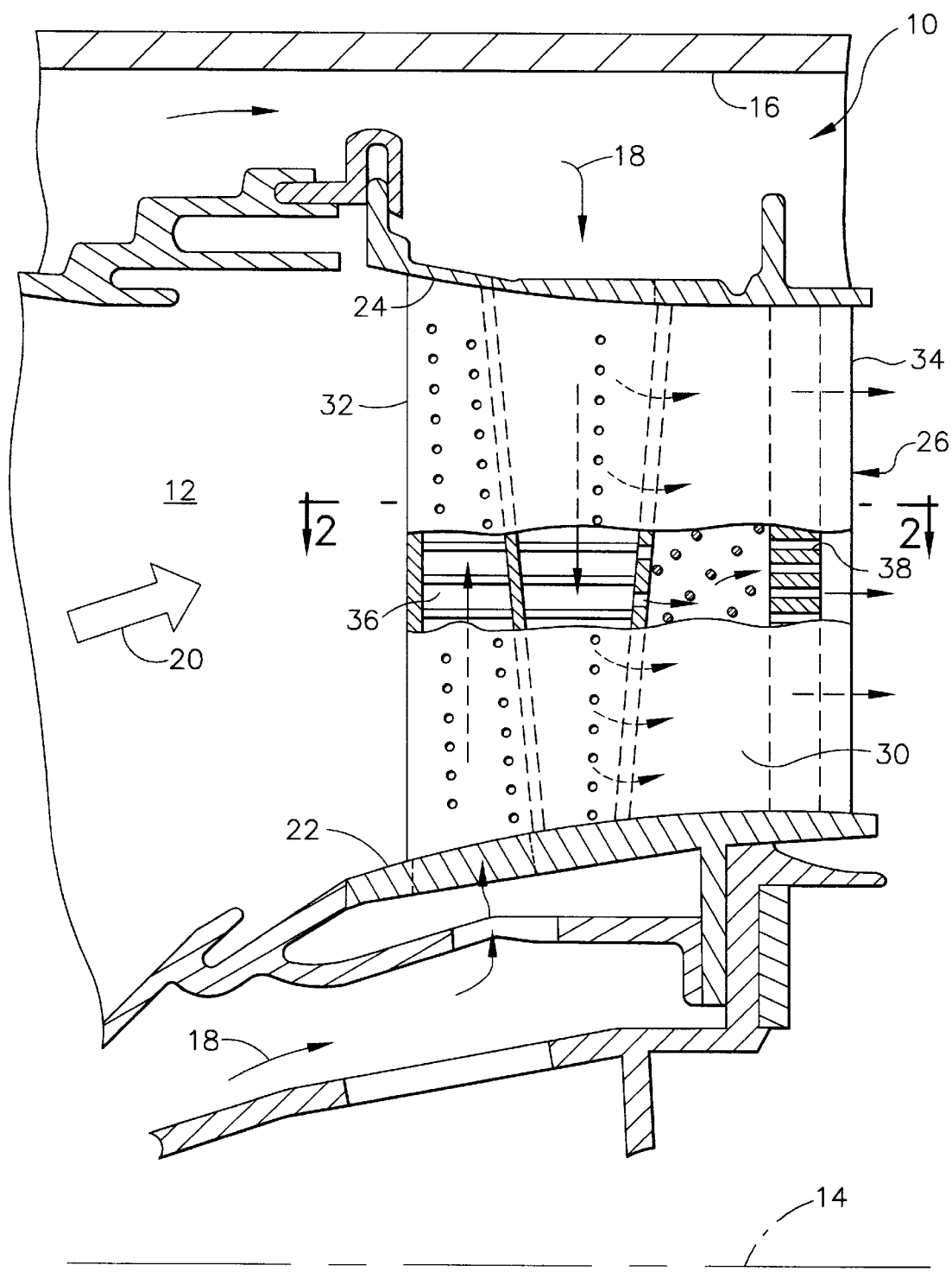
FIG. 1 is a partly sectional, axial view of a portion of a high pressure turbine nozzle disposed at an outlet of a combustor in accordance with an exemplary embodiment of the present invention.

Illustrated in FIG. 1 is a high pressure turbine nozzle 10 disposed at the outlet end of an annular combustor 12, shown in part. The nozzle and combustor are axisymmetrical about a longitudinal or axial centerline axis 14, and are suitably mounted inside an annular casing 16.

The nozzle and combustor are part of a gas turbine engine which may have any conventional configuration in which air 18 is pressurized in a multistage compressor (not shown) and mixed with fuel and ignited in the combustor for generating hot combustion gases 20 which are discharged through the nozzle to a first stage row of turbine rotor blades (not shown) extending outwardly from a supporting rotor disk. The compressor is powered by this first, or high pressure turbine, and a low pressure turbine (not shown) is typically disposed downstream from the first turbine for extracting additional energy from the combustion gases to power a conventional fan (not shown) disposed upstream from the compressor for a typical turbofan aircraft engine application.

The turbine nozzle 10 includes a radially inner band or hub 22 and a radially outer band 24 between which a plurality of circumferentially spaced apart stator vanes 26 extend integrally therewith, typically in the form a unitary casting.

The turbine nozzle is typically formed in a plurality of circumferential sectors, one being shown, with correspondingly arcuate inner and outer bands having two or more vanes therein. The sectors are arranged in a full ring having suitable seals therebetween for reducing thermal stress therein during operation under expansion and contraction of the components as subjected to the hot combustion gases 20 and cooling air 18. The cooling air is obtained by bleeding a portion of the air channeled through the compressor and suitably channeling it through the individual vanes, which are hollow.

Figure 2:
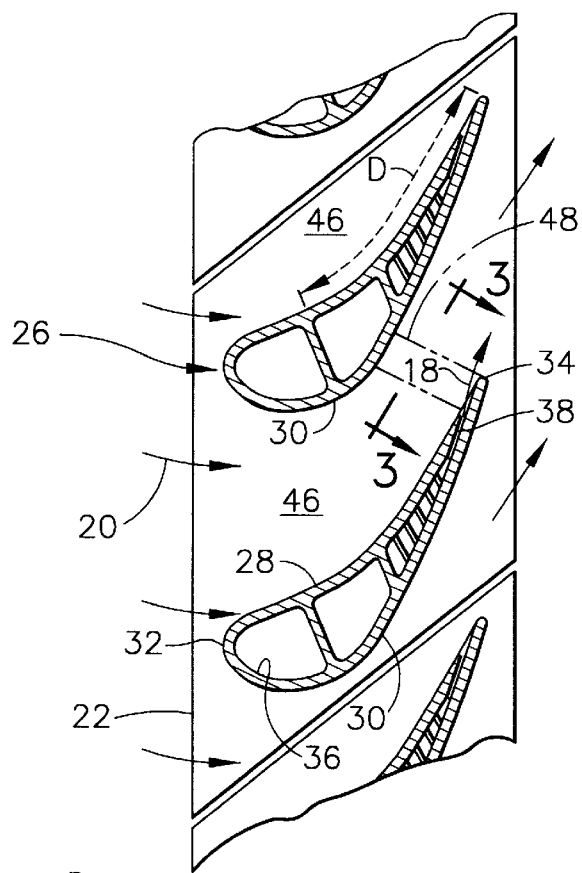
FIG. 2 is a radial sectional, planiform view of a portion of the nozzle illustrated in FIG. 1 and taken along line 2—2.

As shown in FIG. 2, each vane 26 defines an airfoil having a generally concave, pressure side 28 and a generally convex, suction side 30 extending axially between leading and trailing edges 32,34 and radially between the inner and outer bands. The combustion gases first engage the vanes at the leading edges 32 and then split around the two sides of the vane for flow thereover and past the trailing edges.

As shown in FIGS. 1 and 2, each of the vane airfoils 26 is hollow and includes an internal cooling air passage or circuit 36 defined between the pressure and suction sides of the airfoil and between the leading and trailing edges. The air passage 36 may have any conventional form and typically includes multiple passages separated by intervening radial ribs or bridges for channeling the cooling air radially through the vane in single, or multiple passes defining serpentine passages. The inside of the vane may include heat transfer enhancement features such as conventional turbulators on either sidewall of the vane, or transverse pins extending therebetween.

Each vane also includes a row of radially spaced apart trailing edge holes 38 disposed in flow communication with the internal air passage 36 inside the vane behind the trailing edge 34.

Figure 3:
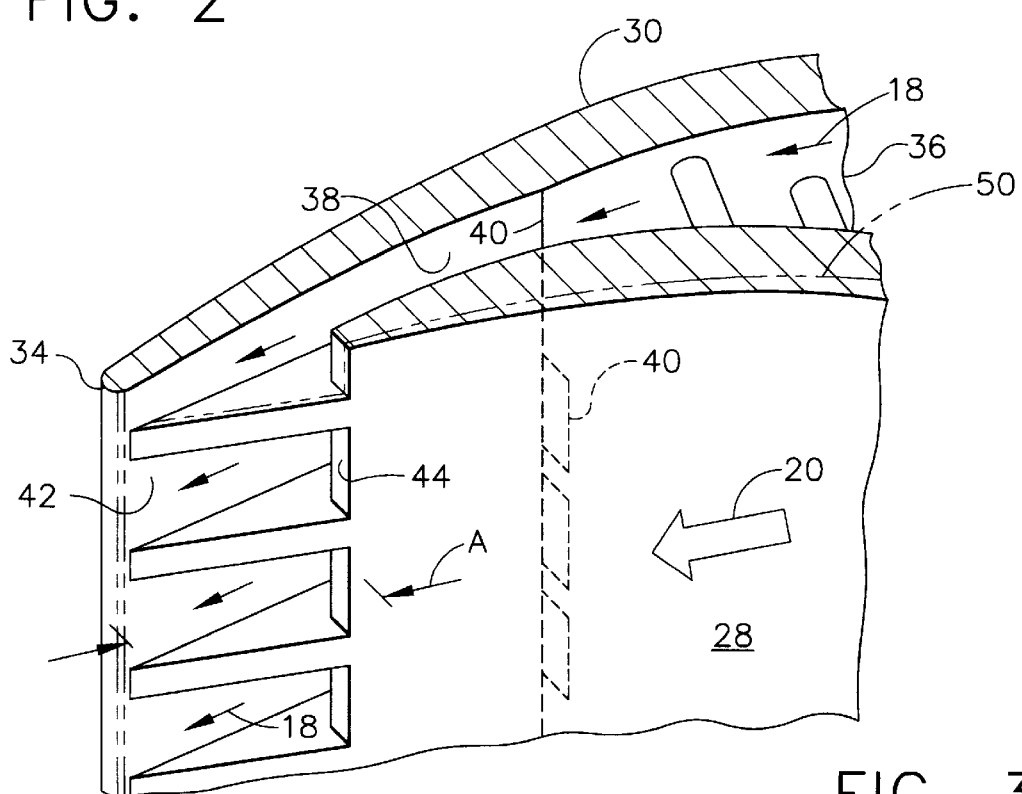
FIG. 3 is a partly sectional, isometric view of a trailing edge region of one of the airfoils illustrated in FIG. 2 and taken along line 3—3.

As shown in more detail in FIG. 3, each of the trailing edge holes 38 includes an inlet 40 spaced upstream or forward of the trailing edge in flow communication with the air passage 36 for receiving the cooling air 18 therefrom. The holes 38 extend axially aft through the vane between its pressure and suction sides to terminate at corresponding outlets or slots 42 extending through the pressure side 28 of the vane.

Each outlet 42 has a breakout lip 44 defining its forward most portion which is spaced upstream from the trailing edge at a breakout distance A. The outlet 42 extends downstream and terminates directly at the trailing edge 34 without reducing the wall thickness thereat. In the exemplary embodiment illustrated in FIG. 3, the profile of the individual outlets 42 is generally rectangular, but may have any suitable profile as desired, with corresponding breakout lips disposed upstream from the trailing edge.

As initially shown in FIG. 2, adjacent vanes 26 are spaced circumferentially apart to define corresponding nozzle flow passages 46 configured for channeling or accelerating the combustion gases 20 therethrough. Each of the vane trailing edges 34 is spaced from a corresponding suction side 30 of an adjacent vane 26 to define a throat 48 of minimum flow area for the nozzle passage 46. The combustion gases 20 enter the individual nozzle passages 46 between corresponding leading edges of adjacent vanes and are accelerated through the passage which converges to the throat 48.

In accordance with the present invention, means are provided for accelerating the combustion gases 20 along the vane pressure side 28 at the trailing edge holes 38 to a velocity at least as high as the velocity of the cooling air 18 discharged from the trailing edges holes.

In a conventional nozzle design, the cooling air discharged from the trailing edge holes has a substantially greater velocity than that of the combustion gases thereat. Correspondingly, when the cooling air mixes with the combustion gases upon discharge from the vane, substantial mixing losses are created which not only decrease the overall efficiency of the engine, but also decrease the ability of the cooling air to cool the trailing edges of the vanes.

By selectively defining the vanes to discharge cooling air at the trailing edge holes with a velocity less than or equal to about the local velocity of the combustion gases, reduced mixing losses will be obtained in accordance with the present invention with a corresponding increase in cooling ability of the discharged air at the trailing edge.

Figure 4:
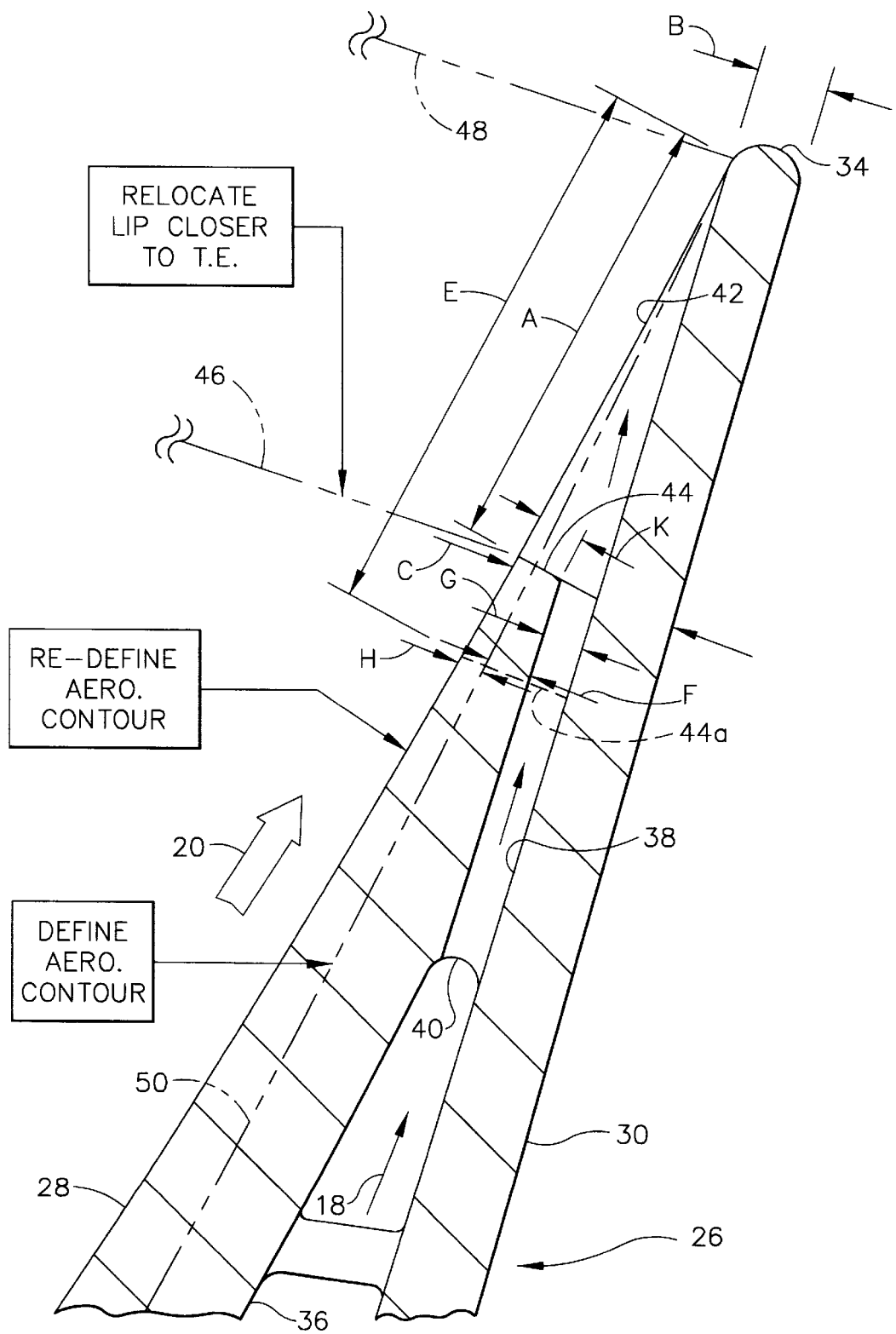
FIG. 4 is an enlarged, radial sectional view of the airfoil trailing edges illustrated in FIGS. 2–3, and a corresponding flowchart representation of a method of making the airfoil in accordance with an exemplary embodiment of the present invention.

An exemplary configuration of the trailing edge region of one of the airfoil vanes illustrated in FIGS. 2 and 3 is shown greatly enlarged in FIG. 4 for clarity of presentation. The sidewalls of each vane 26 which define the pressure and suction sides have a suitable minimum thickness for each engine application, with the suction side 30 having a substantially uniform thickness terminating at a corresponding minimum thickness B at the trailing edge 34. The trailing edge thickness B may be about 25–30 mils (0.64–0.76 mm) for example.

Each vane has a thickness C across the pressure and suction sides at the lip 44. The means for locally accelerating the combustion gases 20 include predeterminedly selecting the vane thickness C at the breakout lip 44 to locally reduce the flow area of the nozzle passage 46 at the breakout lip 44, and at least in part upstream therefrom, for locally accelerating the combustion gases past the lip to a velocity at least as high as the velocity of the discharged cooling air 18 at the breakout lip 44.

As shown in FIG. 4, the vane thickness C varies along the pressure side 28 from the trailing edge 34 upstream therefrom over a length D as shown in FIG. 2 short of the vane leading edge 32 to locally accelerate the combustion gases to the desired velocity at the trailing edge holes.

FIG. 4 illustrates schematically in flowchart form an exemplary method of making the turbine nozzle for obtaining improved performance at the trailing edges. The method begins in any conventional manner for defining the aerodynamic contours or profiles of the several vanes 26 for accelerating the combustion gases 20 through the corresponding nozzle flow passages 46 defined between adjacent vanes from their leading to trailing edges. The initial aerodynamic contour 50 of the vane airfoils illustrated in part in FIG. 4 is shown in solid line along the suction side and in phantom line along the pressure side, with the initial aerodynamic pressure side contour extending from the trailing edge to the leading edge including the length D illustrated in FIG. 2.

After the vane profiles are initially defined, the row of trailing edge holes 38 is disposed inside the vanes behind the trailing edges 34, with the corresponding outlets 42 extending through the pressure sides 28 for discharging the cooling air. In the initial design, the breakout lip, designated 44a, is spaced upstream from the trailing edge 34 at an initial breakout distance E, shown in phantom line in FIG. 4. The breakout distance E of the initial breakout lip 44a is controlled by the minimum permissible thickness F of the lip and the corresponding thickness G of the hole 38 thereat.

The minimum value of the lip thickness F is selected to prevent undesirable burning or oxidation of the lip during operation which would cause deterioration thereof adversely affecting the life of the vane. In a typical nozzle design, the lip thickness F is preferably greater than about 10 mils (0.25 mm), and is preferably about 14 mils (0.36 mm), for example. The corresponding breakout distance E is about 200 mils (5 mm) for a hole width G of about 17 mils (0.43 mm), and a vane thickness C at the lip of about 61 mils (1.55 mm).

The initial contour of the vanes and flow passages 46 therebetween are defined in any conventional manner for optimizing aerodynamic and thermodynamic performance of the nozzle for accelerating the combustion gases between the vanes for subsequent energy extraction by the downstream turbine rotor blades. This initial aerodynamic definition need not include the effects of the trailing edge holes themselves.

As a result, in the design of a conventional turbine nozzle, when trailing edge cooling holes such as those illustrated in FIG. 4, are later introduced into the design of the nozzle, the cooling air discharged therefrom is at a substantially greater velocity than that of the combustion gases flowing therepast. Accordingly, corresponding mixing losses are created as the fast cooling air meets and mixes with the slower combustion gases. And, cooling effectiveness of the discharged cooling air decreases at the expense of a reduction in cooling of the trailing edge 34.

After the initial definition of the aerodynamic contours of the vanes, the aerodynamic contours thereof are then redefined preferably only along the pressure sides 28 thereof, and in particular at the breakout lips and upstream therefrom for locally accelerating the combustion gases to the velocity at least as high as the velocity of the cooling air discharged at the breakout lips.

In the exemplary embodiment illustrated in FIG. 4, the vanes are redefined thicker at the breakout lips by the addition of a thickness increase H for correspondingly narrowing the nozzle passages 46 thereat. The vane is made thicker from its trailing edge 34 along its pressure side 28 over the redefinition distance D illustrated in FIG. 2 to provide a smooth transition and taper for achieving the desired local acceleration of combustion gases at the breakout lips.

In an exemplary embodiment, the vane pressure side 28 is displaced further away from the opposite suction side near the breakout lip location with an thickness increase H of about 7 mils (0.18 mm) for example, for correspondingly locally accelerating the combustion gases. This local acceleration increases the gas velocity by about 4% to offset the otherwise 4% higher velocity of the discharged cooling air at the breakout lips, which would occur without the pressure side contour redefinition.

Accordingly, by initially defining the optimum aerodynamic contour of the vane, and then determining the initial amount of velocity excess of the discharged cooling air for the intended trailing edge cooling holes, the pressure sides of the vanes may then be redefined for locally accelerating the combustion gases with an increased velocity at the breakout lips which will at least offset the otherwise higher velocity of the discharged cooling air. In this way, the cooling air discharged from the trailing edge holes will meet the combustion gases at substantially equal velocity for minimizing the mixing losses therewith.

As shown in phantom in FIG. 4, if the initial location of the breakout lip 44a is maintained at the initial breakout distance E corresponding with the initial aerodynamic contour definition, its thickness will be correspondingly greater by the addition of the thickness increase H thereat. Although this is an acceptable design, further improvements in performance of the vane trailing edges may be obtained.

More specifically, and as illustrated in FIG. 4, the selective increase in vane thickness near the trailing edge introduced by the local accelerating means may be used to advantage to position the breakout lips 44 closer to the trailing edge 34 for further improving cooling effectiveness of the discharged air at the trailing edge 34.

For example, the breakout lips 44 may be spaced closer to the trailing edge 34 at the corresponding breakout distance A for effecting a minimum thickness K thereof for preventing degradation during operation, such as by burning and oxidation. Since thickness H has been added to the pressure side of the vane at the original location of the breakout lips 44a, the lips therefore have a larger thickness than the minimum thickness F required.

Accordingly, the breakout lips may be moved aft and closer to the trailing edge 34 to any suitable breakout distance A less than the original breakout distance E provided the corresponding thickness K of the final breakout lip 44 does not drop below the minimum value thereof.

For example, for the same thickness G of the trailing edge holes 38, the thickness K of the relocated breakout lip 44 may be equal to the minimum thickness F of the original breakout lip 44a, such as 14 mils (0.36 mm) for example. The corresponding breakout distance A for this exemplary design is about 180 mils (4.57 mm) which is significantly less than the original breakout distance E of 200 mils (5.08 mm).

Accordingly, the breakout lip 44 for the specific design illustrated in FIG. 4 is positioned closer to the trailing edge 34 which locates the cooling air discharged from the outlets closer to the trailing edge 34 for increasing the effective cooling thereof.

As shown in FIG. 2, the nozzle passages 46 are defined between the pressure side 28 of one vane and the suction side 30 of an adjacent vane and therefore experience different local velocities therealong. Each vane is an airfoil aerodynamically configured for accelerating the combustion gases over the suction sides with a greater velocity than that over the pressure sides. The vanes and nozzle passages 46 are defined for optimum aerodynamic and thermodynamic performance, with the velocity profile between the vanes correspondingly varying.

By the selective introduction of the local thickness increase H along the pressure side only of the individual vanes for a suitable redefinition length D from the trailing edge to just short of the leading edge, optimum performance of the nozzle is not adversely affective, but further increased due to the reduced mixing losses between the cooling air and the combustion gases at the trailing edge holes, while additionally providing enhanced cooling of the trailing edge itself.

The thickness increase H varies as required from minimum or zero values at the trailing edge 34 and near the leading edge 32, to a maximum value therebetween, with a suitable value at the location of the final breakout lip 44. In this way, the thickness variation transitions gradually along the pressure side of the vane for locally accelerating the combustion gases to substantially match their velocity to the discharged velocity of the cooling air at the breakout lips for reducing mixing losses therefrom and improving trailing edge cooling.

Accordingly, the vane thickness variation is insufficient to accelerate the combustion gases in the majority of the nozzle flow passage 46 to the air velocity at the trailing edge hole outlets 42. The entire extent of the nozzle flow passage 46 may experience its original velocity distribution, with the velocity being locally increased solely at the trailing edge outlets 42 for enhanced performance as described above.

The resulting individual vanes 26 are structurally and functionally different than the unmodified vanes, and cooperate in the turbine nozzle for enhanced performance. Accordingly, the vanes and nozzles resulting from practice of the improved method of making thereof enjoy benefits not otherwise available in the original design.

Although the invention has been described above with respect to an exemplary first stage turbine nozzle design, it may be incorporated in any turbine airfoil which may enjoy the benefits therefrom.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine airfoil for a turbine nozzle including a row of said airfoil defining nozzle flow passages therebetween for accelerating combustion gases therethrough, said airfoil comprising:

pressure and suction sides extending between leading and trailing edges, and defining an internal cooling air passage;

a row of trailing edge holes disposed in flow communication between said air passage and said trailing edge; and means for locally accelerating said combustion gases along said pressure side at said trailing edge holes to a velocity at least as high as the velocity of cooling air discharged from said trailing edge holes.

2. An airfoil according to claim 1 wherein:

each of said trailing edge holes includes an outlet extending through said pressure side, with a breakout lip spaced upstream from said trailing edge; and said accelerating means are configured to position said breakout lips closer to said trailing edge for increased cooling thereof than without said accelerating means.

3. An airfoil according to claim 2 wherein said accelerating means are effective for locally accelerating said combustion gases to a velocity substantially equal to said velocity of cooling air discharged from said trailing edge holes.

4. A turbine airfoil for a turbine nozzle including a row of said airfoils defining nozzle flow passages therebetween for accelerating combustion gases therethrough, said airfoil comprising:

opposite pressure and suction sides extending between opposite leading and trailing edges, and defining an internal cooling air passage therein;

a row of trailing edge holes disposed in flow communication between said trailing edge and said air passage for discharging cooling air therefrom, with corresponding outlets extending through said pressure side and each of said outlets having a breakout lip spaced upstream from said trailing edge; and said airfoil having an aerodynamic contour along said pressure side at said lip including a thickness across said pressure and suction sides at said lip to position said pressure side from an opposite suction side of an adjacent one of said airfoils defining one of said nozzle flow passages for locally accelerating said combustion gases past said lip to a velocity at least as high as the velocity of said cooling air discharged at said breakout lips.

5. An airfoil according to claim 4 wherein said airfoil thickness varies along said pressure side from said trailing edge short of said leading edge to locally accelerate said combustion gases to said velocity at least as high as said air discharge velocity at said trailing edge hole outlets.

6. An airfoil according to claim 5 wherein said airfoil thickness variation is insufficient to accelerate said combustion gases in a majority of said one nozzle flow passage to said air velocity at said trailing edge outlet holes.

7. An airfoil according to claim 5 wherein said breakout lips are spaced from said trailing edge for effecting a minimum thickness thereof for preventing degradation.

8. An airfoil according to claim 4 wherein said accelerating means are effective for locally accelerating said combustion gases to a velocity substantially equal to said velocity of cooling air discharged from said trailing edge holes.

9. A turbine nozzle comprising:

a plurality of vanes extending between inner and outer bands;

each of said vanes including opposite pressure and suction sides extending between opposite leading and trailing edges, and defining an internal cooling air passage therein, and adjacent vanes are spaced circumferentially apart to define nozzle passages for accelerating combustion gases therethrough;

each of said vane trailing edges being spaced from a corresponding suction side of an adjacent vane to define a throat of minimum flow area for said nozzle passages;

each vane further including a row of trailing edge holes disposed in flow communication between said trailing edge and said cooling air passage for discharging cooling therefrom, with corresponding outlets extending through said pressure side, and each of said outlets having a breakout lip spaced upstream from said trailing edge; and each vane having an aerodynamic contour along said pressure side at said lip including a thickness across said pressure and suction sides at said lip to position said pressure side from an opposite suction side of an adjacent one of said vanes for locally accelerating said combustion gases past said lip to a velocity as least as high as the velocity of said cooling air discharged thereat.

10. A nozzle according to claim, 9 wherein said vane thickness varies along said pressure side from said trailing edge short of said leading edge to locally accelerate said combustion gases to said velocity at least as high as said air discharge velocity at said trailing edge hole outlets.

11. A nozzle according to claim 10 wherein said vane thickness variation is insufficient to accelerate said combustion gases in a majority of each said nozzle passage to said air velocity at said trailing edge hole outlets.

12. A nozzle according to claim 10 wherein said breakout lips are spaced from said trailing edge for effecting a minimum thickness thereof for preventing degradation.

13. A nozzle according to claim 9 wherein said accelerating means are effective for locally accelerating said combustion gases to a velocity substantially equal to said velocity of cooling air discharged from said trailing edge holes.

14. A method of making a turbine nozzle comprising:

defining aerodynamic contours of a plurality of vanes for accelerating combustion gases through nozzle flow passages therebetween;

defining a row of trailing edge holes having corresponding outlets extending through pressure sides of said vanes, and each outlet has a breakout lip spaced upstream from said trailing edge at a breakout distance, and said holes are sized for discharging cooling air at a velocity greater than velocity of said combustion gases at said breakout lips; and redefining said aerodynamic contour of said vanes along said pressure sides thereof at said breakout lips for locally accelerating said combustion gases to a velocity at least as high as said velocity of said cooling air discharged at said breakout lips.

15. A method according to claim 14 wherein said vanes are redefined thicker at said breakout lips for correspondingly narrowing said nozzle passages thereat.

16. A method according to claim 15 further comprising relocating said breakout lips closer to said trailing edges for decreasing said breakout distances.

17. A turbine nozzle made by the method of claim 16.

18. A turbine nozzle made by the method of claim 15.

19. A turbine nozzle made by the method of claim 14.

20. A method according to claim 14 wherein said aerodynamic contour is redefined for locally accelerating said combustion gases to a velocity substantially equal to said velocity of cooling air discharged at said breakout lips.

* * * * *